(12) United States Patent
Zhang et al.

(10) Patent No.: US 12,399,267 B2
(45) Date of Patent: Aug. 26, 2025

(54) METHOD, SYSTEM, DEVICE AND STORAGE MEDIUM FOR NON-CONTACT VELOCITY ESTIMATION OF A MOVING TARGET

(71) Applicant: Peking University, Beijing (CN)

(72) Inventors: Daqing Zhang, Beijing (CN); Kai Niu, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 430 days.

(21) Appl. No.: 17/933,796

(22) Filed: Sep. 20, 2022

(65) Prior Publication Data
US 2023/0141843 A1 May 11, 2023

(30) Foreign Application Priority Data
Nov. 10, 2021 (CN) .......................... 202111325057.5

(51) Int. Cl.
*G01S 13/58* (2006.01)
*G01S 7/28* (2006.01)

(52) U.S. Cl.
CPC .......... *G01S 13/582* (2013.01); *G01S 7/2813* (2013.01); *G01S 13/589* (2013.01)

(58) Field of Classification Search
CPC .... G01S 13/582; G01S 13/589; G01S 7/2813; G01S 13/003; G01S 13/87; G01S 13/58; G01S 13/62; G01S 7/006; G01S 7/415; G01S 13/56; G01S 13/583; H04W 84/12; H04W 64/00; H04W 4/027; H04W 4/029; H04W 4/02; H04B 7/0626
See application file for complete search history.

(56) References Cited

U.S. PATENT DOCUMENTS

2010/0002783 A1* 1/2010 Qi ........................ H04L 25/0238
375/260
2018/0095171 A1* 4/2018 Cuichun ............... G01S 13/931
(Continued)

OTHER PUBLICATIONS

Wu, D. et al., "WiDir: Walking Direction Estimation Using Wireless Signals," Proceedings of the The 2016 ACM International Joint Conference on Pervasive and Ubiquitous Computing (UbiComp '16), Sep. 12, 2016, Heidelberg, Germany, 12 pages.
(Continued)

*Primary Examiner* — Olumide Ajibade Akonai
(74) *Attorney, Agent, or Firm* — McCoy Russell LLP

(57) ABSTRACT

The present disclosure relates to a method, a system, a device and a storage medium for non-contact velocity estimation of a moving target. The method comprises the following steps: acquiring channel state information or other information that includes motion information of a moving target through at least two receiving devices, eliminating a random phase offset of the channel state information or other information to acquire newly constructed signals, and performing a denoising and filtering process on the newly constructed signals; identifying a motion state of the target according to the newly constructed signals, and dynamically selecting two optimal receiving devices if the target is moving; respectively extracting a Doppler frequency shift caused by the motion of the target from the two selected optimal receiving devices, and calculating a velocity of the moving target according to the Doppler frequency shifts.

11 Claims, 4 Drawing Sheets

(56) References Cited

U.S. PATENT DOCUMENTS

2019/0020425 A1\* 1/2019 Zhang .............. H04W 56/0035
2022/0417706 A1\* 12/2022 Gummadi ............ H04B 7/0626
2023/0129514 A1\* 4/2023 Faragher ................ G01S 19/26
342/357.26

OTHER PUBLICATIONS

Qian, K. et al., "Widar: Decimeter-Level Passive Tracking via Velocity Monitoring with Commodity Wi-Fi," Proceedings of the 18th ACM International Symposium on Mobile Ad Hoc Networking and Computing (Mobihoc '17), Jul. 10, 2017, New York, New York, 10 pages.

Li, X. et al., "IndoTrack: Device-Free Indoor Human Tracking with Commodity Wi-Fi," Proceedings of the ACM on Interactive, Mobile, Wearable and Ubiquitous Technologies, vol. 1, No. 3, Sep. 2017, 22 pages.

Qian, K et al., "Widar2.0: Passive Human Tracking with a Single Wi-Fi Link," Proceedings of the 16th Annual International Conference on Mobile Systems, Applications, and Services (MobiSys '18), Jun. 10, 2018, Munich, Germany, 12 pages.

Xie, Y. et al., "mD-Track: Leveraging Multi-Dimensionality in Passive Indoor Wi-Fi Tracking," Proceedings of the 25th Annual International Conference on Mobile Computing and Networking (MobiCom '19), Oct. 21, 2019, Los Cabos, Mexico, 16 pages.

Zhang, F. et al., "Wi-Speed: A Statistical Electromagnetic Approach for Device-Free Indoor Speed Estimation," IEEE Internet of Things Journal, vol. 5, No. 3, Jun. 2018, Available as Early as Apr. 12, 2018, 14 pages.

Wu, D. et al., "WiTraj: Robust Indoor Motion Tracking with WiFi Signals," IEEE Transactions on Mobile Computing, Dec. 9, 2021, 18 pages.

\* cited by examiner acquiring channel state information or other information that includes motion information of a moving target through at least two receiving devices, eliminating a random phase offset of the channel state information or other information to acquire a newly constructed signal, and performing a denoising and filtering process on the newly constructed signal identifying a motion state of the target according to the newly constructed signal, and dynamically selecting two optimal receiving devices if the target is moving respectively extracting a Doppler frequency shift caused by the motion of the target from the two optimal receiving devices, and calculating a moving velocity of the target according to the Doppler frequency shifts, wherein the moving velocity includes a speed and a heading

FIG. 1

METHOD, SYSTEM, DEVICE AND STORAGE MEDIUM FOR NON-CONTACT VELOCITY ESTIMATION OF A MOVING TARGET

CROSS-REFERENCE TO RELATED APPLICATION

The present application claims priority to Chinese Patent Application No. 202111325057.5 filed on Nov. 10, 2021. The entire contents of the above-listed application are hereby incorporated by reference for all purposes.

TECHNICAL FIELD

The present disclosure relates to the technical field of velocity estimation, in particular to a method, a system, a device and a storage medium for non-contact velocity estimation of a moving target using wireless radio frequency signals.

BACKGROUND

In the field of context awareness, especially in smart homes, unmanned shopping malls, smart airports and other application scenarios, velocity estimation for a moving target is one of the most important foundations for location tracking, behavior recognition and other applications.

A traditional approach is employing an inertial measurement unit to estimate a velocity of a moving target, which requires the users to carry the velocity estimation device at any time. This contact-based velocity estimation method is unfriendly and intrusive to the users. In contrast, non-contact velocity estimation for a moving target does not require the moving target to carry or touch any device, and has the advantages of non-intrusiveness, high universality and great comfortableness. Using wireless radio frequency devices (such as WiFi routers, 4G/5G mobile terminals) that are common in daily life environments such as home and offices to estimate the velocity of the moving target in a non-contact manner has the advantages of easy deployment and low cost.

Approaches given in the previous work have the following technical problems:

1. The influences of the position and moving direction/heading of the moving target on velocity estimation accuracy are not considered, and high-accuracy velocity estimation in all possible positions and moving directions cannot be guaranteed.

2. Complex optimization algorithms used in the approaches are not conducive to real-time processing, so that real-time requirements of a tracking target trajectory application can hardly be satisfied in real-world scenarios.

3. Only part of the velocity information of the moving target can be estimated, that is, a speed (a magnitude of the velocity) or a moving direction/heading.

SUMMARY

In view of the above problems, the purpose of the present disclosure is to provide a method, a system, a device and a storage medium for non-contact velocity estimation of a moving target, which can accurately estimate a speed and a moving direction/heading of the moving target at the same time under the condition that the moving target does not need to carry or touch any device.

In order to achieve the above objectives, in one aspect, the technical solution adopted by the present disclosure is as follows: a method for non-contact velocity estimation of a moving target comprises: acquiring channel state information or other information that includes motion information of a moving target through at least two receiving devices, eliminating a random phase offset of the channel state information or other information to acquire a newly constructed signal, and performing a denoising and filtering process on the newly constructed signals; identifying a motion state of the target according to the newly constructed signals, and dynamically selecting two optimal receiving devices if the target is moving; and respectively extracting a Doppler frequency shift caused by the motion of the target from the two selected optimal receiving devices, and calculating a velocity of the moving target according to the Doppler frequency shifts, wherein the velocity includes a speed and a heading.

Further, eliminating a random phase offset of the channel state information or other information to acquire a newly constructed signal comprises:

by each receiving device, receiving radio frequency signals from a same transmitting device at the same time from at least two antennas or three subcarriers thereof; and by the receiving device, collecting the channel state information or other information on at least two of the antennas or at least three of the subcarriers for one antenna, and dividing the channel state information or other information collected on each of the two antennas at the same time or performing conjugate multiplication on the channel state information or other information, or dividing or performing conjugate multiplication on the channel state information or other information of different subcarriers on the same antenna to acquire the newly constructed signals, thus eliminating the random phase offset on the channel state information or other information caused by time asynchrony between the receiving device and the transmitting device.

Further, in the denoising and filtering process, a Savitzky-Golay filter or a moving average filtering method is adopted to filter and denoise the newly constructed signals to eliminate the noises.

Further, identifying the motion state of the target according to the newly constructed signals comprises:

if a second peak of values of an autocorrelation function of a amplitude signal or a phase signal of the newly constructed signal of at least one of the receiving devices is greater than a preset first threshold, determining that the target is moving; or if a fluctuation of the amplitude signal or the phase signal of the newly constructed signal of at least one of the receiving devices is greater than a preset second threshold, determining that the target is moving.

Further, dynamically selecting two optimal receiving devices comprises:

calculating position proportional coefficient indexes of all receiving devices, and if a position proportional coefficient index is less than a preset third threshold, excluding the receiving device corresponding to the position proportional coefficient index;

calculating joint indexes of other receiving devices for the same transmitting device, and selecting the receiving devices corresponding to the two largest joint indexes as the two optimal receiving devices; or directly calculating the joint indexes of all receiving devices for the same transmitting device, and select the receiving devices corresponding to the two largest joint indexes as the two optimal receiving devices; or calculating the indexes that can indicate the effect of the target's position and heading for each transmitter-receiver pair based on the formulas $\cos((\alpha_T-\alpha_R)/2)$, $\sin(\theta-(\alpha_T+\alpha_R)/2)$ and $\cos(\theta-(\alpha_T+\alpha_R)/2)$;

where: $\alpha_T$ and $\alpha_R$ are the angles of the position of the target relative to the transmitting device and the receiving device, respectively, $\theta$ is the heading of the target, $\cos((\alpha_T-\alpha_R)/2)$ represents the effect of target's position, $\sin(\theta-(\alpha_T+\alpha_R)/2)$ and $\cos(\theta-(\alpha_T+\alpha_R)/2)$ represents the effect of target's position and heading; and selecting two receiving devices in two transmitter-receiver pairs having the largest absolute values of $|\cos((\alpha_T-\alpha_R)/2)|$, $|\sin(\theta-(\alpha_T+\alpha_R)/2)|$ and/or $|\cos(\theta-(\alpha_T+\alpha_R)/2)|$ as the two optimal receiving devices.

Further, respectively extracting a Doppler frequency shift caused by the motion of the target from the two selected optimal receiving devices comprises:

acquiring a time-frequency spectrum from the newly constructed signal of each receiving device, and selecting a frequency value corresponding to a maximum energy value in the spectrum at each moment as the Doppler frequency shift caused by the motion of the target at that moment.

Further, calculating a velocity of the moving target according to the Doppler frequency shifts comprises:

establishing a system of equations according to the Doppler frequency shifts:

$$\begin{cases} f_{D1} = -(fv\cos(\theta - (\alpha_T + \alpha_{R1})/2) \cdot 2\cos((\alpha_T - \alpha_{R1})/2))/c \\ f_{D2} = -(fv\cos(\theta - (\alpha_T + \alpha_{R2})/2) \cdot 2\cos((\alpha_T - \alpha_{R2})/2))/c \end{cases}$$

Where: $f_{D1}$ and $f_{D2}$ are the Doppler frequency shifts acquired from the optimally selected first and second receiving devices, respectively, and $\alpha_{R1}$ and $\alpha_{R2}$ are angles of a target position relative to the optimally selected first and second receiving devices, respectively; $\alpha_T$ is an angle of the position of the target relative to the transmitting device; $\theta$ is a heading of the target; f is a frequency of the wireless signal; c is the speed of light. In the above equations, c is a constant, f depends on the transmitting device and can be obtained directly for the transmitting device, $\alpha_T$, $\alpha_{R1}$ and $\alpha_{R2}$ can be calculated by the positions of transceivers and the target iteratively when knowing the initial position of the target, then the heading $\theta$ of the target can be acquired by solving the system of equations as follows:

$\theta=(\alpha_T+\alpha_{R1})/2+\text{angle}(\Phi_2-\Phi_1\cos(\Delta\alpha/2),$
$\quad \Phi_1\sin(\Delta\alpha/2));$ Where: $\Phi_1=f_{D1}\cos((\alpha_T-\alpha_{R2})/2))$, $\Phi_2=f_{D2}\cos((\alpha_T-\alpha_{R1})/2))$ $\Delta\alpha=\alpha_{R2}-\alpha_{R1}$, angle(a,b)=arctan 2(b/a) is the four-quadrant arctangent function; the moving speed v of the target is computed by the heading $\theta$ of the target, as follows:

$v=-cf_{D1}/(f\cos(\theta-(\alpha_T+\alpha_{R1})/2)\cdot 2\cos((\alpha_T-\alpha_{R1})/2));$ or, using an optimization algorithm to acquire the moving speed and the heading of the target, so as to minimize an objective function, wherein the objective function $O_{v,\theta}$ may be:

$$O_{v,\theta} = \operatorname*{argmin}(\sum_{j=1}^{M}(f_{Dj} - \hat{f}_{Dj})^2$$

Where: $f_{Dj}$ is the Doppler frequency shift acquired on the j-th receiving device according to the given moving speed v of the target and the heading $\theta$ of the target. $\hat{f}_{Dj}$ is the measured Doppler frequency shift actually acquired on the j-th receiving device. M is the total number of the used receiving devices.

In another aspect, the technical solution adopted by the present disclosure is: a system for non-contact velocity estimation of a moving target comprises a signal processing module, a dynamic optimal selection module and a moving velocity calculation module, wherein the signal processing module is used for acquiring channel state information or other information that includes motion information of a moving target through at least two receiving devices, eliminating a random phase offset of the channel state information or other information to acquire newly constructed signals, and performing a denoising and filtering process on the newly constructed signals; the dynamic optimal selection module is used for identifying the motion state of the target according to the newly constructed signals, and dynamically selecting two optimal receiving devices if the target is moving; and the moving velocity calculation module is used for respectively extracting a Doppler frequency shift caused by motion of the target from the two selected optimal receiving devices, and calculating a velocity of the target according to the Doppler frequency shifts, wherein the velocity includes a speed and a heading.

In a further another aspect, the technical solution adopted by the present disclosure is: a computer-readable storage medium storing one or more programs, wherein the one or more programs include instructions, that, when executed by a computing device, causes the computing device to execute any of the above methods.

In a yet another aspect, the technical solution adopted by the present disclosure is: a computing device which comprises one or more processors, a memory and one or more programs, wherein the one or more programs are stored in the memory and configured to be executed by the one or more processors, and the one or more programs include instructions for executing any of the above methods.

By adopting the above technical solutions, the present disclosure has the following advantages:

1) The present disclosure can meet a real-time requirement of the real-world applications, and can guarantee the accuracy requirement of velocity estimation, and realize optimal or near-optimal velocity estimation accuracy under given device placement.

2) The technical solutions provided by the present disclosure have little requirements for devices and may be implemented on some common commercial wireless radio frequency signal transmitting and receiving devices (such as WiFi network cards, WiFi routers, mobile phone terminals) without modifying any hardware, so the present disclosure has the advantages of easy deployment, low cost and high accuracy.

3) The present disclosure does not require the target to carry or touch any device, and has the advantages of non-intrusive capability, simplicity and ease of use.

4) The present disclosure is suitable for any Radio Frequency (RF) systems with separate receiving and transmitting devices, including but not limited to WiFi devices, 4G/5G devices, RFID devices, LoRa devices or the like and can accurately estimate the speed and the heading of the moving target at the same time under the condition that the moving target does not need to carry or touch any device.

BRIEF DESCRIPTION OF THE FIGURES

FIG. 1 is a schematic diagram of an overall flow of a velocity estimation method in one embodiment of the present disclosure;

DETAILED DESCRIPTION

Figure 2:
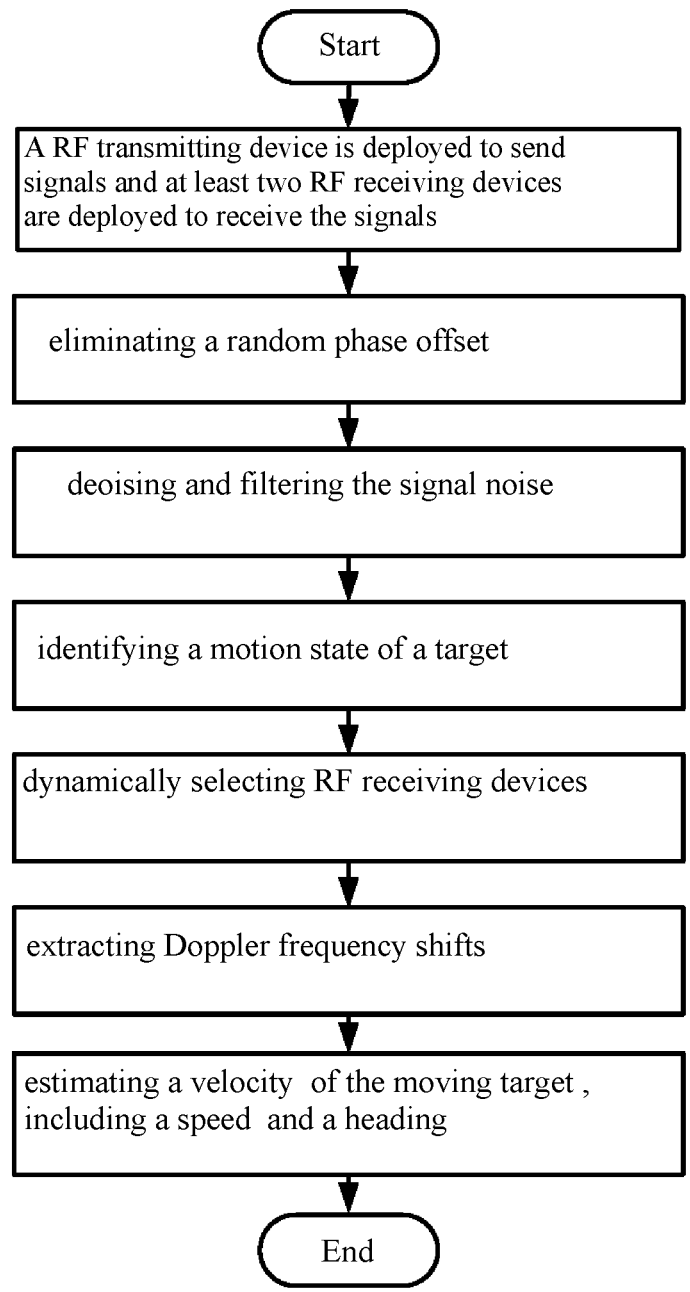
FIG. 2 is a specific flow chart of a method for velocity estimation of a moving target according to one embodiment of the present disclosure.

In order to make the goal, technical solutions of the embodiments of the present disclosure clearer, the technical solutions of the embodiments of the present disclosure will be clearly and completely described below with reference to the drawings of the embodiments of the present disclosure. Obviously, the described embodiments are part of the embodiments of the present disclosure, but not all of the embodiments. Based on the described embodiments of the present disclosure, all other embodiments obtained by those of ordinary skill in the art are within the scope of the present disclosure.

It should be noted that the terms used here are only for describing specific embodiments, and not intended to limit the exemplary embodiments according to the application. As used herein, unless the context clearly indicates, otherwise the singular form is also intended to include the plural form. In addition, it should be understood that when the terms "include" and/or "comprise" are used in the specification, they indicate the presence of features, steps, operations, devices, components and/or combinations thereof.

Basic principle of the present disclosure is: when a target moves in a physical space, the frequency of a RF signal received by a RF receiving device is different from that of a RF signal sent by a RF transmitting device due to a Doppler effect phenomenon, and the frequency difference thereof is called a Doppler frequency shift. According to the present disclosure, the accurate mathematical relationship among the Doppler frequency shift and a moving speed, a heading and a position of a moving target relative to RF transmitting and receiving devices in a RF system with separated transmitting and receiving devices is utilized to quantitatively reveal that accuracy of the velocity of the moving target estimated from the Doppler frequency shift heavily depends on the position and the heading of the moving target relative to the RF transmitting and receiving devices, so the present disclosure puts forward a dynamic optimization selection strategy, which leverages the position and the heading of the target relative to the RF transmitting and receiving devices, automatically and dynamically selects two optimal RF receiving devices from a plurality of RF receiving devices, so as to realize high-accuracy estimation of the velocity of the moving target.

Therefore, the present disclosure provides a method, a system, a device and a storage medium for non-contact velocity estimation of a moving target. For any RF system with separated transmitting and receiving devices that can extract a Doppler frequency shift, at least one RF transmitting device is deployed to send signals and at least two RF receiving devices are deployed to receive the signals, random phase offset noise and amplitude noise are eliminated for the received signals, and whether the target is moving is judged. When the target is moving, two optimal RF receiving devices are dynamically selected to extract the Doppler frequency shifts from the signals, and finally the velocity (including a speed and a heading) of the moving target is estimated. The present disclosure supports analytic solution of the velocity of the moving target, including the speed and heading, and can meet the real-time requirements of the real-world applications. The present disclosure quantitatively depicts influences of the position and heading of the target relative to the RF transmitting and receiving devices on the velocity estimation accuracy, and then puts forward a dynamic optimization selection strategy. Two optimal receiving devices are selected automatically and dynamically from all RF transmitting and receiving devices according to the position and the heading of the target relative to the RF transmitting and receiving devices to extract the Doppler frequency shifts, which are further used to estimate the velocity of the target, thus ensuring that the system can achieve approximately optimal performance.

In the present disclosure, meanings of specific terms are as follows:

RF represents a radio frequency signal, and CSI represents channel state information;

A is a RF transmitting device Tx, which supports transmission of RF signals and is equipped with at least one antenna;

B-C are first and second RF receiving devices, which support receiving of RF signals and are equipped with one or more antennas, respectively;

The RF transmitting device may be a WiFi router, a 4G/5G base station or the like; the RF receiving devices may be WiFi terminals, 4G/5G terminals or the like; and the RF signals may be WiFi signals, 4G/5G signals, etc.

Tx is a RF transmitting device, Rx is a RF receiving device, and a reference coordinate system is established with Tx as the origin and Rx in the positive direction of X axis, which is a form adopted in the embodiment, and the method of the present disclosure is also applicable to similar reference systems;

$P_T^t$ is the position of the target at time t;

v is the moving speed of the target;

θ is the heading of the target;

$v_n$ is a magnitude of a velocity of the target projected on a normal line of an ellipse with Tx and Rx as focuses and the sum of $TxP_T^t$, and $RxP_T^t$ as the long axis on $P_T^t$;

$α_T$ is the Angle of Departure (AoD) of a RF signal;

$α_R$ is the Angle of Arrival (AoA) of a RF signal;

Assuming that the position of the target is (x,y), and the positions of the RF receiving device and the RF transmitting device are $(x_T, y_T)$ and $(x_R, y_R)$, respectively, then:

$α_T$=arctan 2$((y-y_T)/(x-x_T))$, and $α_R$=arctan 2$((y-y_R)/(x-x_R))$, arctan 2(*) is the four-quadrant arctangent function.

In one embodiment of the present disclosure, as shown in FIG. 1, a method for non-contact velocity estimation of a moving target is provided. The embodiment takes the method as an example when the method is applied to a terminal. It is understood that the method may also be applied to a server and a system including a terminal and a server, and the method is implemented through interactions between the terminal and the server. In the embodiment, the method comprises the following steps:

1) acquiring channel state information or other information that includes motion information of a moving target through at least two receiving devices, eliminating a random phase offset of the channel state information or other information to acquire a newly constructed signal, and performing a denoising and filtering process on the newly constructed signal;

2) identifying a motion state of the target according to the newly constructed signals, and dynamically selecting two optimal receiving devices if the target is moving; and 3) respectively extracting a Doppler frequency shift caused by motion of the target from the two selected optimal receiving devices, and calculating a velocity of the target according to the Doppler frequency shifts, wherein the velocity includes a speed and a heading.

Figure 3:
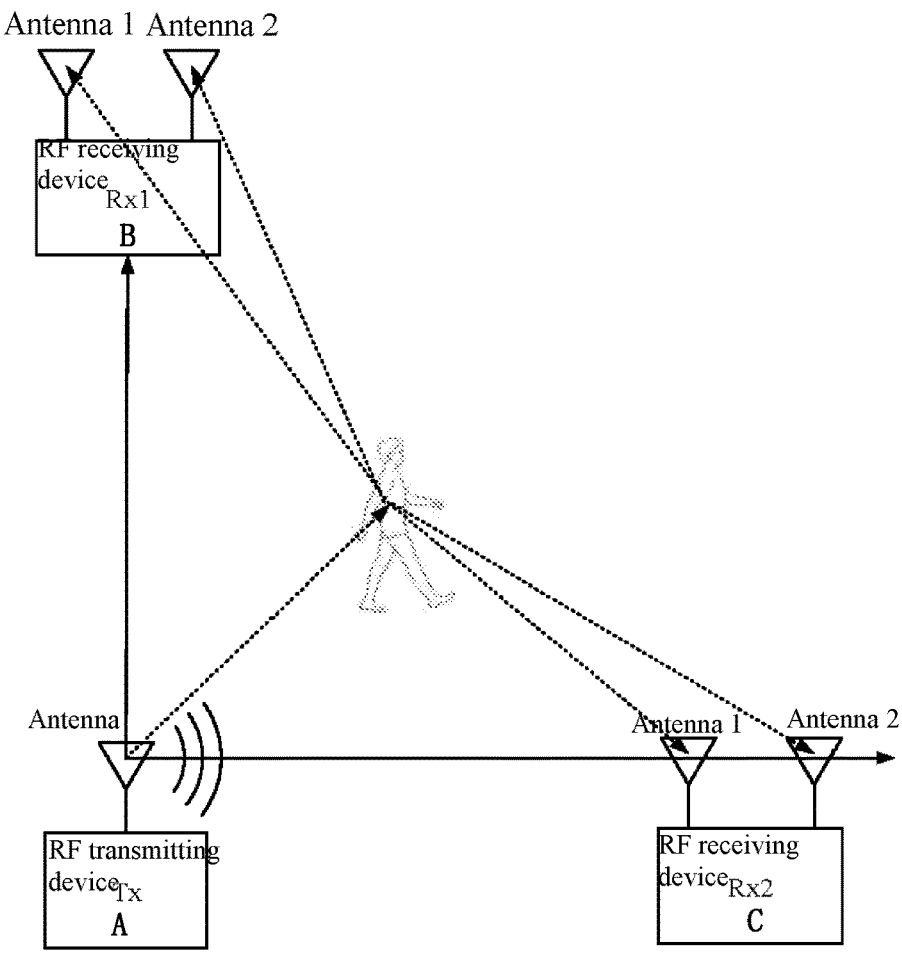
FIG. 3 is a system for non-contact velocity estimation of a moving target, established according to one embodiment of the present disclosure.

In the above step 1), at least three RF transmitting and receiving devices are needed in the embodiment, as shown in FIG. 3, which include one RF transmitting device Tx and at least two RF receiving devices. The RF transmitting device Tx is equipped with at least one antenna to transmit RF signals, and the RF receiving device is equipped with one or more antennas to receive the corresponding RF signals respectively. The RF transmitting and receiving devices may be a notebook computer, MiniPC or any device supporting RF signal transmitting and receiving, and the antenna of the transmitting and receiving devices may be a vertically polarized omnidirectional antenna.

For instance, common WiFi devices are used as signal transmitting devices, and a daily commercial WiFi network card (such as Intel 5300 network card, Atheros AR9580 network card, Atheros AR9590 network card, etc.) is installed on a personal computer as a WiFi signal receiving terminal to collect CSI signals. Common commercial WiFi network cards support one or more antennas, and WiFi signals with a center frequency of 5.32 GHz are used as RF signals, or 2.4 GHz WiFi signals may be also used as RF signals, omnidirectional antennas are used.

For instance, other RF devices may also be selected: for example, 4G/5G base stations as RF signal transmitting devices; 4G/5G terminals as RF receiving devices; and RF signals as wireless signals used by 4G/5G devices.

For instance, other RF devices may also be selected: for example, RFID tags as RF signal transmitting devices (active RFID tags or passive RFID tags); RF receiving devices are RFID readers; and RF signals are wireless signals used by RFID devices.

For instance, other RF devices may also be selected: for example, LoRa nodes as RF signal transmitting devices; LoRa gateways as RF receiving devices; and RF signals are wireless signals used by LoRa devices.

In the above step 1), as shown in FIG. 2, the newly constructed signal is acquired after elimination of the random phase offset of the channel state information or other information: for each RF receiving device, one or more antennas are used to eliminate the random phase offset caused by clock asynchrony between the transmitting and receiving devices, wherein the random phase offset refers to a random phase offset caused by a RF signal sampling frequency shift, a carrier frequency shift, a packet detection frequency shift, a device startup phase lock, etc. Specifically:

Each receiving device receives radio frequency signals from the same transmitting device from one or more antennas thereof at the same time;

The receiving device collects the channel state information or other information on one or more antennas, and performs division or conjugate multiplication on the channel state information or other information collected on each of the antennas or subcarriers at the same time to acquire a newly constructed signal, which eliminates the random phase offset caused by time asynchrony between the receiving device and the transmitting device.

In the embodiment, for each RF receiving device, the RF receiving device receives RF signals from the same RF transmitting device from one or more antennas thereof at the same time; the RF receiving device collects channel state information (CSI) or other information on one or more antennas or different subcarriers, and divides the CSIs collected on each of the antennas or on different subcarriers at the same time to eliminate the random phase offset on the signal caused by time asynchrony between the RF receiving device and the RF transmitting device. For example, at time t, the channel state information of a RF signal with a frequency f on one antenna is $H_1(f,t)$, and the channel state information on the other antenna is $H_2(f,t)$, and the newly constructed signal after eliminating the random phase offset is obtained as: $S(f,t)=H_1(f,t)/H_2(f,t)$. Or by dividing the channel state information of different subcarriers of the same antenna to eliminate the random phase offset, for example, $S(f,t)=(H(f1,t)/H(f2,t))/(H(f3,t)/H(f4,t))$.

For instance, for each RF receiving device, the RF receiving device receives RF signals from the same RF transmitting device from at least two antennas thereof or subcarriers of the same antenna at the same time; the RF receiving device collects channel state information (CSI) on at least two antennas or subcarriers, and performs conjugate multiplication on the CSIs collected on each of the antennas or subcarriers at the same time, so as to eliminate the random phase offset on the signal caused by time asynchrony between the RF receiving device and the RF transmitting device. For example, at time t, for a RF signal with a frequency f, the channel state information on one antenna is $H_1(f,t)$, and the channel state information on the other antenna is $H_2(f,t)$, and the new channel state information after eliminating the random phase offset is: $S(f,t)=H_1(f,t)\overline{H_2}(f,t)$, wherein $\overline{a}$ represents the conjugate of a.

In step 1) above, during denoising and filtering, a Savitzky-Golay filter or a moving average filtering method is used to for denoising and filtering of the newly constructed signal.

In the embodiment, for each RF receiving device, the noise in the acquired the newly constructed signal after eliminating the random phase offset is further filtered and reduced:

For instance, for new signals $[S_1(f,t), S_2(f,t), \ldots, S_N(f,t)]$ acquired at consecutive N moments, the Savitzky-Golay filter is used for noise reduction and filtering of the new signal acquired so as to generate a signal $S_s(f,t)=[S_{1s}(f,t), S_{2s}(f,t), \ldots, S_{Ns}(f,t)]$ after noise elimination and filtering.

For instance, for new signals $[S_1(f,t), S_2(f,t), \ldots, S_N(f,t)]$ acquired at consecutive N moments, the moving average filtering method is used for noise reduction and filtering of the new signal acquired, so as to generate a signal $S_s(f,t)=[S_{1s}(f,t), S_{2s}(f,t), \ldots, S_{Ns}(f,t)]$ after noise elimination and filtering.

In step 2) above, the motion state of the target is identified according to the newly constructed signals, specifically:

If a second peak of values of an autocorrelation function of an amplitude signal or a phase signal of the newly constructed signal of at least one receiving device is greater than a preset first threshold, it is determined that the target is moving;

or, if a fluctuation of the amplitude signal or the phase signal of the newly constructed signal of at least one receiving device is greater than a preset second threshold, it is determined that the target is moving.

In the embodiment, all RF receiving devices in at least two RF receiving devices are used to judge whether the target is moving according to the signal after noise reduction and filtering.

For instance, a method of calculating the autocorrelation of the denoised and filtered signal $S_s(f,t)$ is adopted. A second peak value is taken from a spectrogram acquired by an autocorrelation function, whether the target is moving is judged according to the set threshold value, and that the target is moving is determined when the second peak value of the autocorrelation function of at least one RF receiving device in all RF receiving devices is greater than a set threshold value.

For instance, the fluctuation of the signal may be calculated, and when the fluctuation of the amplitude signal of the channel state information of at least one RF receiving device in all RF receiving devices is greater than a set threshold, it is determined that the target is moving.

In step 2) above, the two optimal receiving devices are dynamically selected: if the target is moving, the two optimal receiving devices are selected automatically and dynamically from at least two RF receiving devices.

Because the relationship between the estimation accuracy of the moving speed of the target and the Doppler frequency shift accuracy is: $d_v = -c/(f \cos(\theta - (\alpha_T + \alpha_R)/2) \cdot 2 \cos((\alpha_T - \alpha_R)/2)) d_{fD}$, where: $d_v$ indicates the accuracy of the magnitude of the velocity (i.e., speed) of the target, that is, the difference with the real speed; $d_{fD}$ represents the accuracy of the Doppler frequency shift, that is, the difference with a real Doppler frequency shift value; c is the speed of light, which is a constant; f is the frequency of the RF signal; $\theta$ is the heading of the target; $\alpha_T$ and $\alpha_R$ are the angles of the position of the target relative to the RF transmitting device and the RF receiving device, respectively, which are also called the Angle of Departure (AoD) and the Angle of Arrival (AoA) of the RF signal. Assuming that the position of the target is (x,y), and the positions of the RF receiving device and the RF transmitting device are respectively $(x_T, y_T)$ and $(x_R, y_R)$, then $\alpha_T = \arctan 2((y-y_T)/(x-x_T))$, $\alpha_R = \arctan 2((y-y_R)/(x-x_R))$, and arctan 2(*) are the four-quadrant arctangent function. Regardless of the symbols, in order to accurately estimate the magnitude of the velocity of the target, that is, minimize $d_v$, the RF receiving device which maximizes $\cos(\theta - (\alpha_T + \alpha_R)/2)$ should be selected according to the heading $\theta$ of the target and the position of the target relative to the RF transmitting and receiving devices; on the other hand, the RF receiving device which maximizes $\cos((\alpha_T - \alpha_R)/2)$ should be selected according to the position of the target relative to the RF transmitting and receiving devices.

The relationship between the estimation accuracy of the heading of the target and the Doppler frequency shift accuracy is as follows: $d_\theta = c/(vf \sin(\theta - (\alpha_T + \alpha_R)/2) \cdot 2 \cos((\alpha_T - \alpha_R)/2)) d_{fD}$, where: $d_\theta$ represents the accuracy of the heading of the target, that is, the difference with the real heading value; $d_{fD}$ represents the accuracy of Doppler frequency shift, that is, the difference with the real Doppler frequency shift value; c is the speed of light, which is a constant; v is the magnitude of the velocity (i.e., speed) of the target; f is the frequency of the RF signal; $\theta$ is the heading of the target; $\alpha_T$ and $\alpha_R$ are the angles of the position of the target relative to the RF transmitting device and the RF receiving device, respectively, which are also called the Angle of Departure (AoD) and the Angle of Arrival (AoA) of the RF signal. Assuming that the position of the target is (x,y), and the positions of the RF receiving device and the RF transmitting device are respectively $(x_T,y_T)$ and $(x_R,y_R)$, then $\alpha_T = \arctan 2((y-y_T)/(x-x_T))$, and $\alpha_R = \arctan 2((y-y_R)/(x-x_R))$, and arctan 2(*) is the four-quadrant arctangent function s. Regardless of the symbols, in order to accurately estimate the heading of the target, that is, minimize $d_v$, the RF receiving device which maximizes $\sin(\theta - (\alpha_T + \alpha_R)/2)$ should be selected according to the heading $\theta$ of the target and the position of the target relative to the RF transmitting and receiving devices; on the other hand, the RF receiving device which maximizes $\cos((\alpha_T - \alpha_R)/2)$ should be selected according to the position of the target relative to the RF transmitting and receiving devices.

Specifically, the two optimal receiving devices are dynamically selected by using one of the following three methods:

Method 1: position proportional coefficient indexes $|\cos((\alpha_{T_{t-1}} - \alpha_{R_{t-1}}^j)/2)|$ of all receiving devices are calculated, and if a position proportional coefficient index is less than a preset third threshold, the receiving device corresponding to the position proportional coefficient index is excluded;

joint indexes of other receiving devices for the same transmitting device are calculated, and the receiving devices corresponding to the two largest joint indexes are selected as the two optimal receiving devices;

For example, firstly, according to the position of the target at the last moment, for the same RF transmitting device, the position proportional coefficient index $|\cos((\alpha_{T_{t-1}} - \alpha_{R_{t-1}}^j)/2)|$ corresponding to the j-th RF receiving device is calculated, where $\alpha_{T_{t-1}}$ is the AoD of the target at time t−1, $\alpha_{R_{t-1}}^j$ is the AoA of the target on the corresponding j-th RF receiving device at time t−1; the index is calculated for each RF receiving device among all RF receiving devices, and a threshold value is set to exclude the receiving devices with the indexes smaller than the threshold value; then, in order to give consideration to the estimation accuracy of both the moving speed and the heading of the target, according to the position and the heading $\theta_{t-1}$ of the target at the last moment, the joint index $|\cos((\alpha_{T_{t-1}} - \alpha_{R_{t-1}}^j)/2) \cdot \sin(\theta_{t-1} - (\alpha_{T_{t-1}} + \alpha_{R_{t-1}}^j)/2)|$ corresponding to the j-th RF receiving device is calculated for the same RF transmitting device, and the joint index is calculated for all RF receiving devices after exclusion in the previous step, and the two RF receiving devices with the largest joint index are selected as the two optimal RF receiving devices.

Among them, the position of the moving target relative to the RF transmitting and receiving devices at the last moment and the heading at the last moment can directly give the real position of the moving target; or, the position of the moving target at the last moment relative to the RF transmitting and receiving devices and the heading at the last moment may be iteratively acquired by giving the initial position and the initial heading and combining with the velocity estimated by the present disclosure.

Method 2: the joint indexes of all receiving devices for the same transmitting device are directly calculated, and the receiving devices corresponding to the two largest joint indexes are selected as two optimal receiving devices;

For example, according to the position and heading $\theta_{t-1}$ of the target at the last moment, for the same RF transmitting device, the joint index $|\cos(\theta_{t-1} - (\alpha_{T_{t-1}} + \alpha_{R_{t-1}}^j)/2) \cdot \sin(\theta_{t-1} - (\alpha_{T_{t-1}} + \alpha_{R_{t-1}}^j)/2) \cdot \cos((\alpha_{T_{t-1}} - \alpha_{R_{t-1}}^j)/2)|$ corresponding to the j-th RF receiving device is calculated, where $\alpha_{T_{t-1}}$ is the AoD of the target at the moment t−1 and $\alpha_{R_{t-1}}^j$ is the AoA of the target on the corresponding j-th RF receiving device at the moment t−1; the joint index is calculated for each RF receiving device among all RF receiving devices, and the two RF receiving devices with the largest joint index are automatically selected as the two optimal RF receiving devices.

Method 3: calculating the indexes that can indicate the effect of the target's position and heading for each transmitter-receiver pair based on the formulas $\cos((\alpha_T-\alpha_R)/2)$, $\sin(\theta-(\alpha_T+\alpha_R)/2)$ and $\cos(\theta-(\alpha_T+\alpha_R)/2)$;

where: $\alpha_T$ and $\alpha_R$ are the angles of the position of the target relative to the transmitting device and the receiving device, respectively, $\theta$ is the heading of the target, $\cos((\alpha_T-\alpha_R)/2)$ represents the effect of target's position, $\sin(\theta-(\alpha_T+\alpha_R)/2)$ and $\cos(\theta-(\alpha_T+\alpha_R)/2)$ represents the effect of target's position and heading; and selecting two receiving devices in two transmitter-receiver pairs having the largest absolute values of $|\cos((\alpha_T-\alpha_R)/2)|$, $|\sin(\theta-(\alpha_T+\alpha_R)/2)|$ and/or $|\cos(\theta-(\alpha_T+\alpha_R)/2)|$ as the two optimal receiving devices.

In step 3) above, the Doppler frequency shift caused by the motion of the target is extracted from the two selected optimal receiving devices respectively, specifically, a time-frequency spectrum is acquired from the newly constructed signal of each receiving device, and the frequency value corresponding to the maximum energy in the time-frequency spectrum at each moment is selected as the Doppler frequency shift caused by the motion of the target at that moment.

In the embodiment, a time-frequency spectrum is acquired from the denoised and filtered signal $S_s(f,t)$ of each RF receiving device by using a time-frequency analysis method, that is Continuous 1-D Wavelet Transform (CWT) method, and the frequency value corresponding to the maximum energy value in the time-frequency spectrum at each moment is selected as the Doppler frequency shift caused by the motion of the target at that moment.

For instance, the time-frequency spectrum is acquired from the denoised and filtered signal $S_s(f,t)$ of each RF receiving device by using a time-frequency analysis method, that is Short Time Fourier Transform (STFT), and the frequency value corresponding to the maximum energy value in the time-frequency spectrum at each moment is selected as the Doppler frequency shift caused by the motion of the target at that moment.

In step 3) above, the velocity of the target is calculated according to the Doppler frequency shift: the velocity of the target, including the speed and the heading, is calculated according to the Doppler frequency shift extracted from the two RF receiving devices that are optimally selected.

Figure 4:
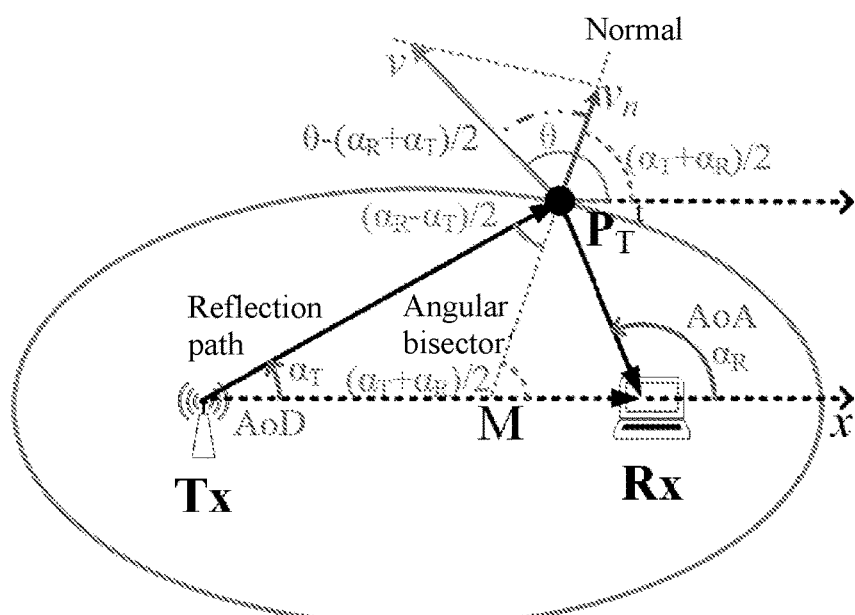
FIG. 4 is a diagram showing a relationship between a Doppler frequency shift and a speed of a moving target, a heading of the moving target and a position of the moving target relative to RF transmitting and receiving devices according to one embodiment of the present disclosure.

As shown in FIG. 4, for a given pair of RF transmitting and receiving devices, the relationship between the Doppler shift caused by the target and the position of the target relative to the RF transmitting and receiving devices, and the speed and the heading is $f_D=-(fv\cos(\theta-(\alpha_T+\alpha_R)/2)\cdot 2\cos((\alpha_T-\alpha_R)/2))/c$, where f is a frequency of a RF signal; v is a moving speed of the target; $\theta$ is a heading of the target; $\alpha_T$ and $\alpha_R$ are angles of the position of the target relative to the RF transmitting device and the RF receiving device, respectively, also called the Angle of Departure (AoD) and the Angle of Arrival (AoA) of the RF signal. Assuming that the position of the target is (x,y), and the positions of the RF receiving device and the RF transmitting device are $(x_T, y_T)$ and $(x_R, y_R)$ respectively, then $\alpha_T=\arctan 2((y-y_T)/(x-x_T))$, and $\alpha_R=\arctan 2((y-y_R)/(x-x_R))$, $\arctan 2(*)$ is the four-quadrant arctangent function; and c is the speed of light, which is a constant.

The velocity of the target is calculated by using one of the following two methods:

Method 1: An equation may be acquired for each of the two optimally selected RF receiving devices, and a system of equations is established according to the Doppler frequency shift:

$$\begin{cases} f_{D1} = -(fv\cos(\theta-(\alpha_T+\alpha_{R1})/2)\cdot 2\cos((\alpha_T-\alpha_{R1})/2))/c \\ f_{D2} = -(fv\cos(\theta-(\alpha_T+\alpha_{R2})/2)\cdot 2\cos((\alpha_T-\alpha_{R2})/2))/c \end{cases}$$

Where: $f_{D1}$ and $f_{D2}$ are Doppler frequency shifts acquired from the optimally selected first and second receiving devices, $\alpha_{R1}$ and $\alpha_{R2}$ are angles of the position of the target relative to the optimally selected first and second receiving devices, respectively; $\alpha_T$ is the angle of the position of the target relative to the transmitting device; $\theta$ is the heading of the target; f is the frequency of the wireless signal; c is the speed of light. In the above equations, c is a constant, f depends on the transmitting device and can be obtained directly for the transmitting device, $\alpha_T$, $\alpha_{R1}$ and $\alpha_{R2}$ can be calculated by the positions of transceivers and the target iteratively when knowing the initial position of the target, thus, the heading $\theta$ is acquired by solving:

$$\theta=(\alpha_T+\alpha_{R1})/2+\text{angle}(\Phi_2-\Phi_1\cos(\Delta\alpha/2),\Phi_1\sin(\Delta\alpha/2)),$$

Where: $\Phi_1=f_{D1}\cos((\alpha_T-\alpha_{R2})/2))$, $\Phi_2=f_{D2}\cos((\alpha_T-\alpha_{R1})/2))$, $\Delta\alpha=\alpha_{R2}-\alpha_{R1}$, angle(a,b)=arctan 2(b/a) is the four-quadrant arctangent function; and the moving speed v of the target is obtained by solving the system of equations:

$$v=-cf_{D1}/(f\cos(\theta-(\alpha_T+\alpha_{R1})/2)\cdot 2\cos((\alpha_T-\alpha_{R1})/2)).$$

Method 2: The moving speed and direction of the target may be acquired by using an optimization algorithm to minimize an objective function without dynamically selecting RF receiving device optimally. The objective function $O_{v,\theta}$ may be:

$$O_{v,\theta}=\text{argmin}(\Sigma_{j=1}^M(f_{Dj}-\hat{f}_{Dj})^2$$

Where: $f_{Dj}$ is the Doppler frequency shift acquired on the j-th receiving device according to the given moving speed v of the target and the heading $\theta$ of the target, $\hat{f}_{Dj}$ is the measured Doppler frequency shift acquired on the j-th receiving device, and M is the total number of the receiving devices used.

In the above embodiments, after the RF transmitting and receiving devices are arranged in step 1), other steps may be executed in real time, such as steps of eliminating the random phase offset, performing denoising and filtering of the signal noise, identifying the motion state of the target, dynamically selecting the RF receiving devices, extracting the Doppler frequency shifts and estimating the velocity of the target.

In an embodiment of the present disclosure, a system for non-contact velocity estimation of a moving target is provided, which includes a signal processing module, a dynamic optimal selection module and a moving velocity calculation module, wherein the signal processing module is used for acquiring channel state information or other information that includes motion information of a moving target through at least two receiving devices, eliminating a random phase offset of the channel state information or other information to acquire newly constructed signals, and performing a denoising and filtering process on the newly constructed signals;

the dynamic optimal selection module is used for identifying a motion state of the target according to the newly constructed signals, and dynamically selecting two optimal receiving devices if the target is moving; and the moving velocity calculation module is used for respectively extracting a Doppler frequency shift caused by motion of the target from the two selected optimal receiving devices, and calculating a velocity of the target according to the Doppler frequency shifts, wherein the velocity includes a speed and a heading.

The system provided by the embodiment is used to execute the above-mentioned methods in the embodiments. Please refer to the above-mentioned embodiments for specific processes and details, which will not be repeated here.

Figure 5:
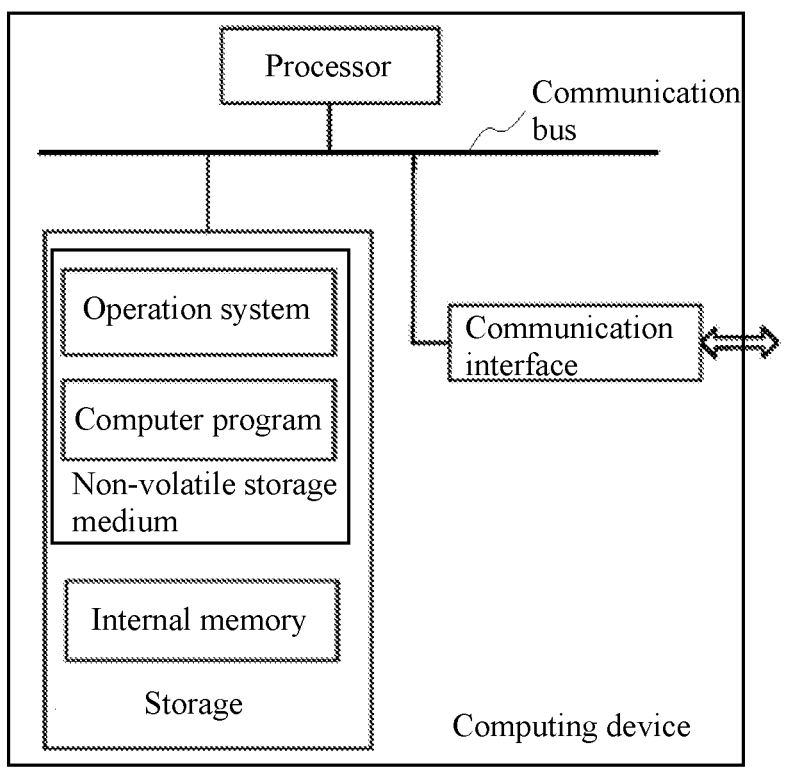
FIG. 5 is a structural diagram of a computing device in one embodiment of the present disclosure.

As shown in FIG. 5, it is a schematic structural diagram of a computing device provided in an embodiment of the present disclosure. The computing device may be a terminal, which may include a processor, a communications interface, a storage, a display screen and an input device. The processor, the communication interface and the storage communicate with each other through communication buses. The processor is used to provide computing and control capabilities. The storage includes a non-volatile storage medium and an internal memory, wherein the non-volatile storage medium stores an operating system and computer programs, and the computer programs are executed by a processor to realize a measurement method; and the internal memory provides an environment for the operation of the operating system and computer programs in the nonvolatile storage medium. The communication interface is used for wired or wireless communication with external terminals, and the wireless mode may be realized by WiFi, a manager network, NFC (Near Field Communication) or other technologies. The display screen may be a liquid crystal display screen or an electronic ink display screen, and the input device may be a touch layer covered on the display screen, a button, a trackball or a touch pad arranged on the shell of the computing device, and an external keyboard, a touch pad or a mouse as well. The processor can call logic instructions in the memory to perform the following method:

acquiring channel state information or other information that includes motion information of a moving target through at least two receiving devices; eliminating a random phase offset of the channel state information or other information to acquire newly constructed signals; performing a denoising and filtering process on the newly constructed signals; identifying a motion state of the target according to the newly constructed signals; dynamically selecting two optimal receiving devices if the target is moving; respectively extracting a Doppler frequency shift caused by motion of the target from the two selected optimal receiving devices, and calculating a velocity of the target according to the Doppler frequency shifts, wherein the velocity includes a speed and a heading.

In addition, the above-mentioned logic instructions in the memory may be realized in the form of software functional units and may be stored in a computer readable storage medium when sold or used as an independent product. Based on this understanding, the technical solution of the present disclosure may be embodied in the form of a software product, which is stored in a storage medium and includes several instructions to make a computer device (which may be a personal computer, a server, or a network device, etc.) perform all or part of the steps of the methods described in various embodiments of the present disclosure. The aforementioned storage media include: a USB disk, a removable hard disk, a Read-Only Memory (ROM), a Random Access Memory (RAM), a magnetic disk or an optical disk and other media that can store program codes.

Those skilled in the art can understand that the structure shown in FIG. 5 is only a block diagram of a part of the structure related to the solution of the application, and does not constitute a limitation on the computing device to which the solution of the application is applied. The specific computing device may include more or less components than those shown in the diagram, or combine some components, or have different component arrangements.

In an embodiment of the present disclosure, a computer program product is provided, which includes a computer program stored on a non-transitory computer readable storage medium, wherein the computer program includes program instructions. When the program instructions are executed by a computer, the computer may execute the methods provided by the above-mentioned method embodiments, for example, including: acquiring channel state information or other information that includes motion information of a moving target through at least two receiving devices; eliminating a random phase offset of the channel state information or other information to acquire newly constructed signals; performing a denoising and filtering process on the newly constructed signals; identifying a motion state of the target according to the newly constructed signals; dynamically selecting two optimal receiving devices if the target is moving; respectively extracting a Doppler frequency shift caused by motion of the target from the two selected optimal receiving devices, and calculating a velocity of the target according to the Doppler frequency shifts, wherein the velocity includes a speed and a heading.

In an embodiment of the present disclosure, a non-transient computer-readable storage medium is provided, which stores server instructions that make a computer execute the methods provided in the above embodiments, for example, including: acquiring channel state information or other information that includes motion information of a moving target through at least two receiving devices; eliminating a random phase offset of the channel state information or other information to acquire newly constructed signals; performing a denoising and filtering process on the newly constructed signals; identifying a motion state of the target according to the newly constructed signals; dynamically selecting two optimal receiving devices if the target is moving; respectively extracting a Doppler frequency shift caused by motion of the target from the two selected optimal receiving devices, and calculating a velocity of the target according to the Doppler frequency shifts, wherein the velocity includes a speed and a heading.

The implementation principle and technical effects of the computer-readable storage medium provided by the above embodiment are similar to those of the above method embodiments, which will not be repeated here.

The application is described with reference to flow charts and/or block diagrams of methods, devices (systems), and computer program products according to embodiments of the application. It should be understood that each flow and/or block in the flow charts and/or block diagrams, as well as combinations of flows and/or blocks in the flow charts and/or block diagrams may be implemented by computer program instructions. These computer program instructions may be provided to the processor of a general-purpose computer, a special-purpose computer, an embedded processor or other programmable data processing device to produce a machine, so that the instructions executed by the processor of the computer or other programmable data processing device produce means for realizing the functions specified in one or more flow charts and/or one or more block diagrams.

These computer program instructions can also be stored in a computer-readable memory that can guide a computer or other programmable data processing device to work in a specific way, so that the instructions stored in the computer-readable memory produce an article of manufacture including instruction devices that implement the functions specified in one or more flow charts and/or one or more block diagrams.

These computer program instructions can also be loaded on a computer or other programmable data processing device, so that a series of operation steps are executed on the computer or other programmable device to generate computer-implemented processing, so that the instructions executed on the computer or other programmable device provide steps for realizing the functions specified in one or more flows of the flowchart and/or one or more blocks of the block diagram.

Finally, it should be noted that the above embodiments are only used to illustrate the technical solutions of the present disclosure, but not to limit them; although the present disclosure has been described in detail with reference to the foregoing embodiments, those of ordinary skill in the art should understand that it is still possible to modify the technical solutions described in the foregoing embodiments, or equivalently replace some of its technical features; however, these modifications or substitutions do not make the essence of the corresponding technical solutions deviate from the spirit and scope of the technical solutions of each embodiment of the present disclosure.

The invention claimed is:

1. A method for non-contact velocity estimation of a moving target, comprising:
   acquiring channel state information that includes motion information of a target through at least two receiving devices, eliminating a random phase offset of the channel state information to acquire newly constructed signals, and performing a denoising and filtering process on the newly constructed signals;
   identifying a motion state of the target according to the newly constructed signals, and dynamically selecting two optimal receiving devices if the target is moving; and
   respectively extracting a Doppler frequency shift caused by motion of the target from the two selected optimal receiving devices, and calculating a velocity of the target according to Doppler frequency shifts, wherein the velocity includes a speed and a heading.

2. The method for non-contact velocity estimation of the moving target according to claim 1, wherein eliminating a random phase offset of the channel state information to acquire newly constructed signals comprises:
   receiving radio frequency signals from a same transmitting device at the same time by each receiving device from at least two antennas of the receiving device or at least three subcarriers for one antenna; and
   collecting the channel state information on the at least two antennas or at least three subcarriers for one antenna by each receiving device, and dividing the channel state information collected on each of the antennas or subcarriers at the same time or performing conjugate multiplication on them to acquire the newly constructed signals, thus eliminating the random phase offset caused by time asynchrony between the receiving devices and the transmitting device.

3. The method for non-contact velocity estimation of the moving target according to claim 1, wherein in the denoising and filtering process, a Savitzky-Golay filter or a moving average filtering method is adopted to filter and denoise the newly constructed signals.

4. The method for non-contact velocity estimation of the moving target according to claim 1, wherein identifying the motion state of the target according to the newly constructed signals comprises:
   if a second peak of values of an autocorrelation function of a amplitude signal or a phase signal of each of the newly constructed signals of at least one of the receiving devices is greater than a preset first threshold, determining that the target is moving; or
   if a fluctuation of the amplitude signal or the phase signal of the newly constructed signals of at least one of the receiving devices is greater than a preset second threshold, determining that the target is moving.

5. The method for non-contact velocity estimation of the moving target according to claim 1, wherein dynamically selecting two optimal receiving devices comprises:
   calculating the indexes that can indicate the effect of the target's position and heading for each transmitter-receiver pair based on the formulas $\cos((\alpha_T-\alpha_R)/2)$, $\sin((\theta-(\alpha_T+\alpha_R)/2)$ and $\cos(\theta-(\alpha_T+\alpha_R)/2)$;
   where: $\alpha_T$ and $\alpha_R$ are the angles of the position of the target relative to the transmitting device and the receiving device, respectively, $\theta$ is the heading of the target, $\cos((\alpha_T-\alpha_R)/2)$ represents the effect of target's position, $\sin(\theta-(\alpha_T+\alpha_R)/2)$ and $\cos(\theta-(\alpha_T+\alpha_R)/2)$ represents the effect of target's position and heading; and
   selecting two receiving devices in two transmitter-receiver pairs having the largest absolute values of $|\cos((\alpha_T-\alpha_R)/2)|$, $|\sin(\theta-(\alpha_T+\alpha_R)/2)|$ and/or $|\cos(\theta-(\alpha_T+\alpha_R)/2)|$ as the two optimal receiving devices.

6. The method for non-contact velocity estimation of the moving target according to claim 1, wherein dynamically selecting two optimal receiving devices comprises:
   calculating position proportional coefficient indexes of all of the receiving devices, and if a position proportional coefficient index is less than a preset third threshold, excluding the receiving device corresponding to the position proportional coefficient index;
   calculating joint indexes of each of other receiving devices with respect to the same transmitting device, and selecting the receiving devices corresponding to the largest two joint indexes as the two optimal receiving devices; or
   directly calculating the joint indexes of all receiving devices with respect to the same transmitting device, and selecting the receiving devices corresponding to the largest two joint indexes as the two optimal receiving devices.

7. The method for non-contact velocity estimation of the moving target according to claim 1, wherein respectively extracting a Doppler frequency shift caused by motion of the target from the two optimal receiving devices comprises:
   acquiring a time-frequency spectrum from the newly constructed signals of each receiving device, and selecting a frequency value corresponding to a maximum energy value in the time-frequency spectrum at each moment as the Doppler frequency shift caused by the motion of the target at that moment.

8. The method for non-contact velocity estimation of the moving target according to claim 1, wherein calculating a velocity of the target according to the Doppler frequency shifts comprises:
   establishing a system of equations according to the Doppler frequency shifts:

$$\begin{cases} f_{D1} = -(fv\cos(\theta - (\alpha_T + \alpha_{R1})/2) \cdot 2\cos((\alpha_T - \alpha_{R1})/2))/c \\ f_{D2} = -(fv\cos(\theta - (\alpha_T + \alpha_{R2})/2) \cdot 2\cos((\alpha_T - \alpha_{R2})/2))/c \end{cases}$$

wherein: $f_{D1}$ and $f_{D2}$ are the Doppler frequency shifts acquired from the optimally selected first and second receiving devices respectively, and $\alpha_{R1}$ and $\alpha_{R2}$ are angles of the position of the target relative to the optimally selected first and second receiving devices, respectively; $\alpha_T$ is an angle of the position of the target relative to the transmitting device; $\theta$ is a heading of the target; f is a frequency of a radio frequency signal; c is the speed of light; f depends on the transmitting device and can be obtained directly for the transmitting device, $\alpha_T$, $\alpha_{R1}$ and $\alpha_{R2}$ can be calculated iteratively when knowing an initial position of the target, then the heading $\theta$ of the target, acquired by solving the system of equations is:

$\theta = (\alpha_T + \alpha_{R1})/2 + \text{angle}(\Phi_2 - \Phi_1 \cos(\Delta\alpha/2), \Phi_1 \sin(\Delta\alpha/2))$;

where: $\Phi_1 = f_{D1}\cos((\alpha_T - \alpha_{R2})/2)$, $\Phi_2 = f_{D2}\cos((\alpha_T - \alpha_{R1})/2)$, $\Delta\alpha = \alpha_{R2} - \alpha_{R1}$, angle(a,b) = arc tan2 (b/a) is the four-quadrant arctangent function;

the moving speed v of the target is acquired by the heading $\theta$ of the target:

$v = -cf_{D1}/(f \cos((\theta - (\alpha_T + \alpha_{R1})/2) \cdot 2 \cos((\alpha_T - \alpha_{R1})/2))$;

or, using an optimization algorithm to acquire the moving speed and the heading of the target, so as to minimize an objective function, wherein the objective function $O_{v,\theta}$ is:

$$O_{v,\theta} = \text{argmin}\left(\sum_{j=1}^{M}(f_{Dj} - \hat{f}_{Dj})^2\right)$$

where: $f_{Dj}$ is the measured Doppler frequency shift acquired on the j-th receiving device according to the given moving speed v of the target and the heading $\theta$ of the target; $\hat{f}_{Dj}$ is the measured Doppler frequency shift actually acquired on the j-th receiving device; M is the total number of the used receiving devices.

9. A system for non-contact velocity estimation of a moving target, comprising: a signal processing module, a dynamic optimal selection module and a moving velocity calculation module, wherein the signal processing module is used for acquiring channel state information that includes motion information of a target through at least two receiving devices, eliminating a random phase offset of the channel state information to acquire newly constructed signals, and performing a denoising and filtering process on the newly constructed signals;

the dynamic optimal selection module is used for identifying a motion state of the target according to the newly constructed signals, and dynamically selecting two optimal receiving devices if the target is moving; and the moving velocity calculation module is used for respectively extracting a Doppler frequency shift caused by motion of the target from the two selected optimal receiving devices, and calculating a velocity of the target according to the Doppler frequency shifts, wherein the velocity includes a speed and a heading.

10. A non-transitory computer-readable storage medium storing one or more programs, wherein the one or more programs include an instruction that, when executed by a computing device, causes the computing device to execute the method according to claim 1.

11. A computing device, comprising:
one or more processors, a memory and one or more programs, wherein the one or more programs are stored in the memory and configured to be executed by the one or more processors, and the one or more programs include instructions for executing the method according to claim 1.

* * * * *